(12) United States Patent
Hicks

(10) Patent No.: US 8,308,602 B2
(45) Date of Patent: Nov. 13, 2012

(54) GEAR MOUNTING

(75) Inventor: Raymond John Hicks, Llangammarch Wells (GB)

(73) Assignee: Orbital2 Limited, Chipping Campden, Gloucestershire (GB)

( * ) Notice: Subject to any disclaimer, the term of this patent is extended or adjusted under 35 U.S.C. 154(b) by 751 days.

(21) Appl. No.: 11/993,581

(22) PCT Filed: Jul. 6, 2006

(86) PCT No.: PCT/GB2006/002499
§ 371 (c)(1),
(2), (4) Date: Aug. 24, 2009

(87) PCT Pub. No.: WO2007/007049
PCT Pub. Date: Jan. 18, 2007

(65) Prior Publication Data
US 2010/0077881 A1    Apr. 1, 2010

(30) Foreign Application Priority Data

Jul. 8, 2005 (GB) .................................. 0513977.9

(51) Int. Cl.
*F16H 57/08* (2006.01)

(52) U.S. Cl. .......................... 475/331; 475/346; 475/347
(58) Field of Classification Search .................. 475/331, 475/346, 347
See application file for complete search history.

(56) References Cited

U.S. PATENT DOCUMENTS

| 3,303,713 | A |   | 2/1967 | Hicks |
|---|---|---|---|---|
| 4,104,932 | A | * | 8/1978 | Hansson ........................ 475/347 |
| 4,700,583 | A | * | 10/1987 | Hicks .............................. 74/410 |
| 6,117,041 | A |   | 9/2000 | Avery et al. |
| 2004/0235604 | A1 |   | 11/2004 | Fox |

FOREIGN PATENT DOCUMENTS

| EP | 0 003 894 | 9/1979 |
|---|---|---|
| GB | 691775 | 5/1953 |

* cited by examiner

*Primary Examiner* — Tisha Lewis
(74) *Attorney, Agent, or Firm* — King & Schickli, PLLC

(57) ABSTRACT

A gear mounting has a spindle (11) extending substantially normal to a carrier (12) and capable of radial excursions from an initial position, when under load. The spindle and carrier have generally conical abutment surfaces (23, 24) normals to which extend substantially through the centroid of a projecting portion of the spindle, and in the initial position of the spindle there is a gap between the abutment surfaces.

12 Claims, 4 Drawing Sheets

GEAR MOUNTING

FIELD OF THE INVENTION

This invention relates to gear mountings.

It is primarily concerned with mounting planet pinions and their epicyclic gearing, although it can also be applied to other forms of parallel shaft gear trains

BACKGROUND OF THE INVENTION

The mountings of pinions in a cantilever fashion from the side of a carrier by means of a "flexible pin" is known. An example is illustrated in U.S. Pat. No. 3,303,713. As can be seen in FIG. 1 of that document the pins equalise the load by bending. This can be very effective but the pin bending stresses are high under peak or overload conditions. The trend, therefore, has been to strengthen the pins by increasing pin diameter, reducing their flexibility and hence their sensitivity to equalise the normal loads.

SUMMARY OF THE INVENTION

From one aspect the invention consists in a gear mounting having a spindle extending substantially normal to a carrier and capable of radial excursions from an initial position, when under load, characterised in that the spindle and carrier have generally frustoconical abutment surfaces normals to which extend substantially through the centroid of a projecting portion of the spindle and in that in the initial position of the spindle there is a gap between the abutment surfaces.

The provision of the gap provides a surprisingly simple solution to the problems set out above. The existence of the gap means that during a pre-determined range of loading, the normal load range, the spindle will be stressed in bending only, but once a pre-determined radial load is reached, then the spindle will bend to such an extent that the conical abutment surfaces will contact creating a reaction load from the carrier on to the spindle whereby the spindle is stressed in tension and bending and hence can resist the damaging consequences of overload with acceptable stress levels. Further the load at which such a reaction load comes into play can readily be determined, for a particular spindle construction, by the dimension of the gap.

Thus, in a preferred embodiment, the gap is of sufficient dimension to allow the spindle to be stressed in bending only up to a pre-determined load and the gap dimension is such that when the pre-determined load is reached or exceeded the abutment surfaces engage to generate a reaction load whereby the spindle is stressed in tension and bending.

The spindle is preferably cantilevered from the carrier and includes radially inner and outer members, the spindle abutment surface being on the outer member. Conveniently the inner member is a tension bolt, which in some constructions may be surrounded by a sleeve. The carrier may include a ring, or generally annular insert, which defines the abutment surface on the carrier. One advantage of this arrangement is that a range of rings or inserts can be constructed to allow for different gap dimensions. It will be appreciated that in an unloaded condition the engagement between the outer and inner members and the carrier is such that the outer member is held clear of the carrier by the pre-determined amount.

The invention also includes preferably a gear box including one or more gear mountings as defined above.

BRIEF DESCRIPTION OF THE DRAWING FIGURES

The invention may be performed in various ways and specific embodiments will now be described, by way of example, with reference to the accompanying drawings, in which.

DETAILED DESCRIPTION OF THE INVENTION

Figure 1:
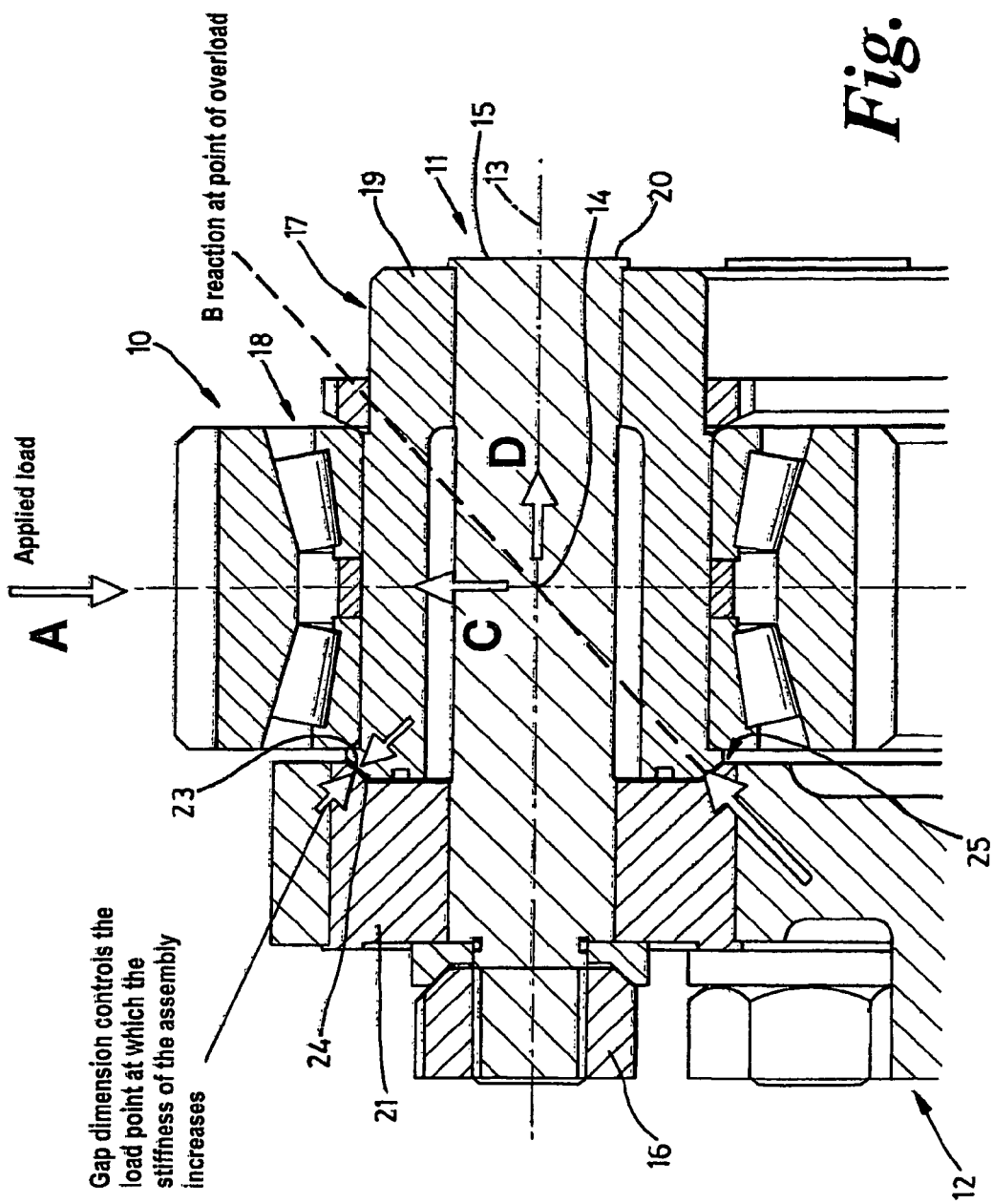
FIG. 1 is a vertical cross section through a first embodiment of a gear mounting.

In FIG. 1 a planet gear 10 is co-axially mounted on a spindle, generally indicated at 11, to project laterally from a carrier. The common axis of the planet gear 10 and the spindle 11, when the latter is in its relaxed state, is indicated at 13, whilst the centroid of the cantilevered portion of the spindle 11 is indicated at 14.

The spindle 11 comprises a bolt 15 secured by a nut 16 to the carrier 12 and their sleeve 17. The planet gear 10 is mounted on the sleeve 17 by a bearing assembly, generally indicated at 18. At its end 19, which is remote from the carrier 12, the sleeve 17 has an inwardly projecting annular flange dimensioned to form a friction fit on the bolt 15, which has a head 20 to firmly retain sleeve 17.

The carrier 12 includes an annular insert 21, which forms a portion of the carrier 12 that surrounds the bolt 15.

The end 22 of the tube 17, which faces the insert 21, and the insert 21 are formed with respective frustoconical abutment surfaces 23, 24 that are separated in the normal or unloaded position, by a gap 25.

During normal loading of the planet wheel, the applied load is directed towards the centroid 14 and the pin 15 will bend in a manner, which is known to those skilled in the art and is particularly described in connection with FIG. 1 of U.S. Pat. No. 3,303,713, the description of which is incorporated herein by reference.

In this condition the stress on the spindle is in bending only, which is desirable to allow the spindle to act as a true flexible pin to accommodate the deflection of the planet gear 10, whilst maintaining parallelism of the axis of the planet gear 10 and the unloaded axis 13.

However, when a particular pre-determined load is reached, the deflection of the spindle 11 will be such that the frustoconical abutment surfaces 23 and 24 come into contact generating the reaction load indicated by the arrow B, which in turn creates the vector loads C, D at the centroid 14. The spindle then becomes stressed in both tension and bending in a manner to resist the over load and hence preventing damage to the gear box as a whole.

As has been mentioned before the pre-set dimension of the gap 25 determines the load at which the surfaces 23, 24 will abut and hence the degree of bending of the spindle 11, which can occur in normal operation when the spindle is stressed in bending only.

Figure 2:
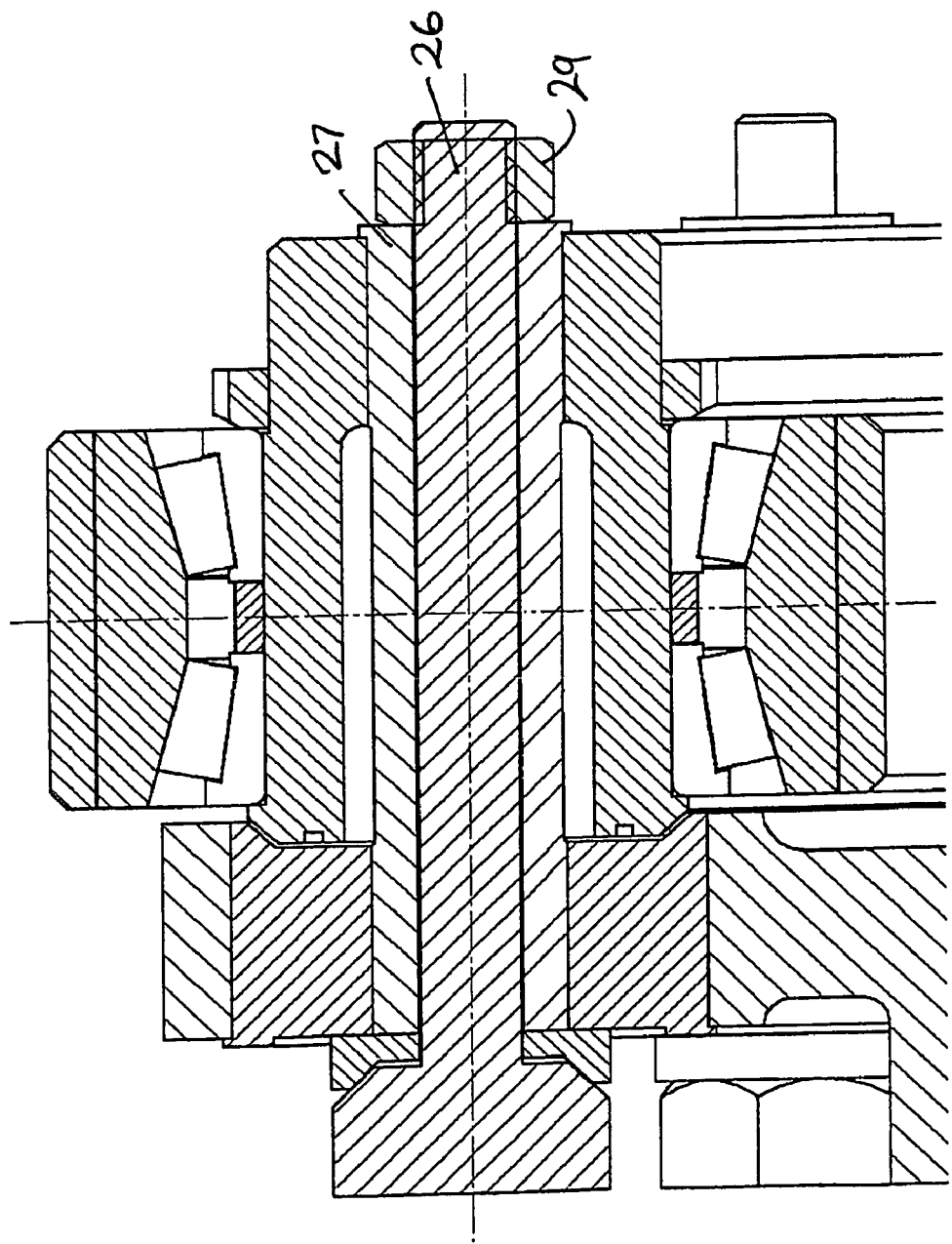
FIG. 2 is a view corresponding to FIG. 1, but with a different spindle construction.
Figure 3:
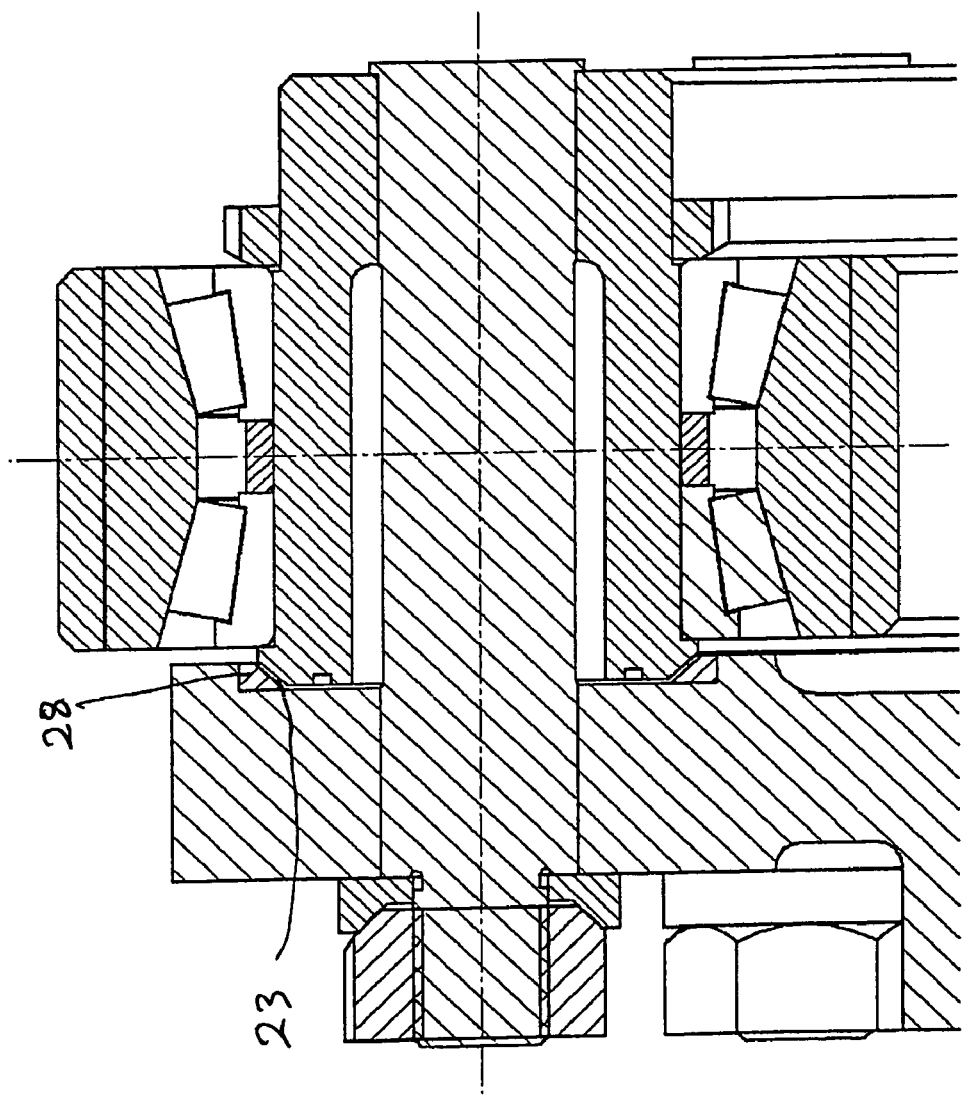
FIG. 3 is a view corresponding to FIG. 1 with an integral carrier.
Figure 4:
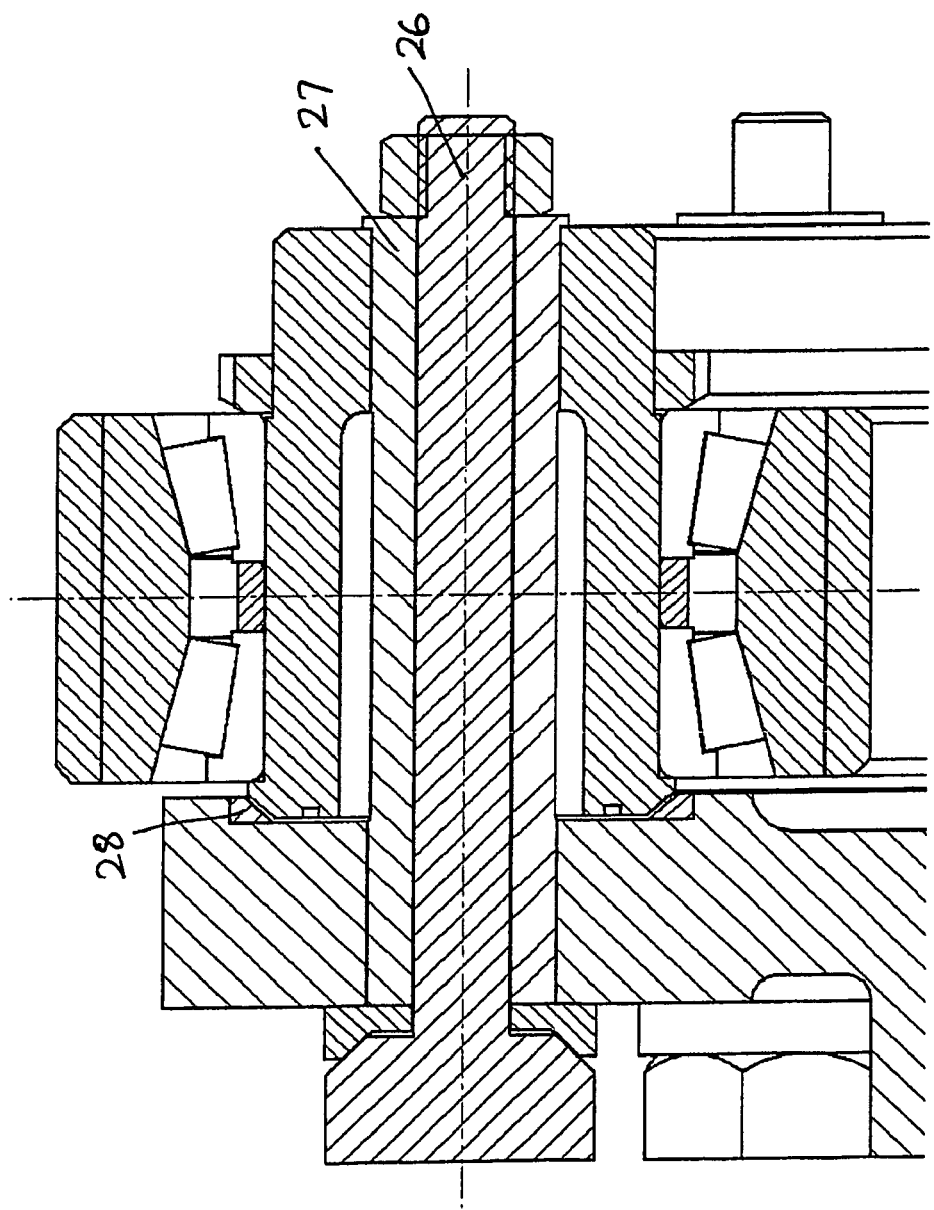
FIG. 4 is a view corresponding to FIG. 2 with an integral carrier.

FIG. 2 illustrates an alternative embodiment wherein the bolt 15 comprises a central bolt 26 and an outer tube 27. FIGS. 3 and 4 essentially correspond to FIGS. 1 and 2 respectively, but instead of the insert 21, the carrier 12 is integral and has the abutment surface 24 formed on a ring 28. In FIG. 4, the bolt 26 is threaded in to the tube 27 rather than being held thereon simply by a nut 29 as occurs in FIG. 2.

In some arrangements the ring 21 could be dispensed with and the Abutment surface 23 formed directly on the carrier 12, but the use of the ring allows a hardened or otherwise suitably treated material to be used.

The invention claimed is:

1. A gear mounting having a spindle extending substantially normal to a carrier and capable of radial excursions from an initial position, when under load, characterised in that the spindle and carrier have generally frusto-conical abutment surfaces, normals to which extend substantially through the centroid of a projecting portion of the spindle and in that in the initial position of the spindle there is a gap between the abutment surfaces, said gap being sufficiently dimensioned to allow the spindle to be stressed in bending only up to a pre-determined load, such that when the pre-determined load is reached or exceeded, the abutment surfaces will engage to generate a reaction load whereby the spindle is stressed in tension and bending.

2. A gear mounting as claimed in claim 1 wherein the spindle is cantilevered from the carrier and includes radially inner and outer members and wherein the spindle abutment surface is on the outer member.

3. A gear mounting as claimed in claim 2 wherein, the inner member is a tension bolt.

4. A gear mounting as claimed in claim 1 wherein the carrier includes a ring or generally annular insert, which defines the abutment surface on the carrier.

5. A gear mounting as claimed in claim 3, wherein the tension bolt is surrounded by a sleeve.

6. A gear box including one or more gear mountings as claimed in claim 1.

7. A gear mounting having:
   a spindle extending substantially normal to a carrier and capable of radial excursions from an initial position, when under load, characterised in that the spindle and carrier have generally frusto-conical abutment surfaces, normals to which extend substantially through the centroid of a projecting portion of the spindle, and in that in the initial position of the spindle there is a gap between the abutment surfaces, said gap configured to allow the spindle to be stressed in bending only up to a predetermined load;
   wherein the abutment surfaces are configured to engage each other at or above the predetermined load to generate a reaction load whereby the spindle is stressed in tension and bending.

8. A gear mounting as claimed in claim 7, wherein the spindle is cantilevered from the carrier and includes radially inner and outer members and wherein the spindle abutment surface is on the outer member.

9. A gear mounting as claimed in claim 8, wherein the inner member is a tension bolt.

10. A gear mounting as claimed in claim 9, wherein the tension bolt is surrounded by a sleeve.

11. A gear mounting as claimed in claim 7, wherein the carrier includes a ring or generally annular insert, which defines the abutment surface on the carrier.

12. A gear box including one or more gear mountings as claimed in claim 7.

* * * * *